L. J. FITZGERALD.
VEHICLE-BRAKES.
No. 194,515. Patented Aug. 28, 1877.
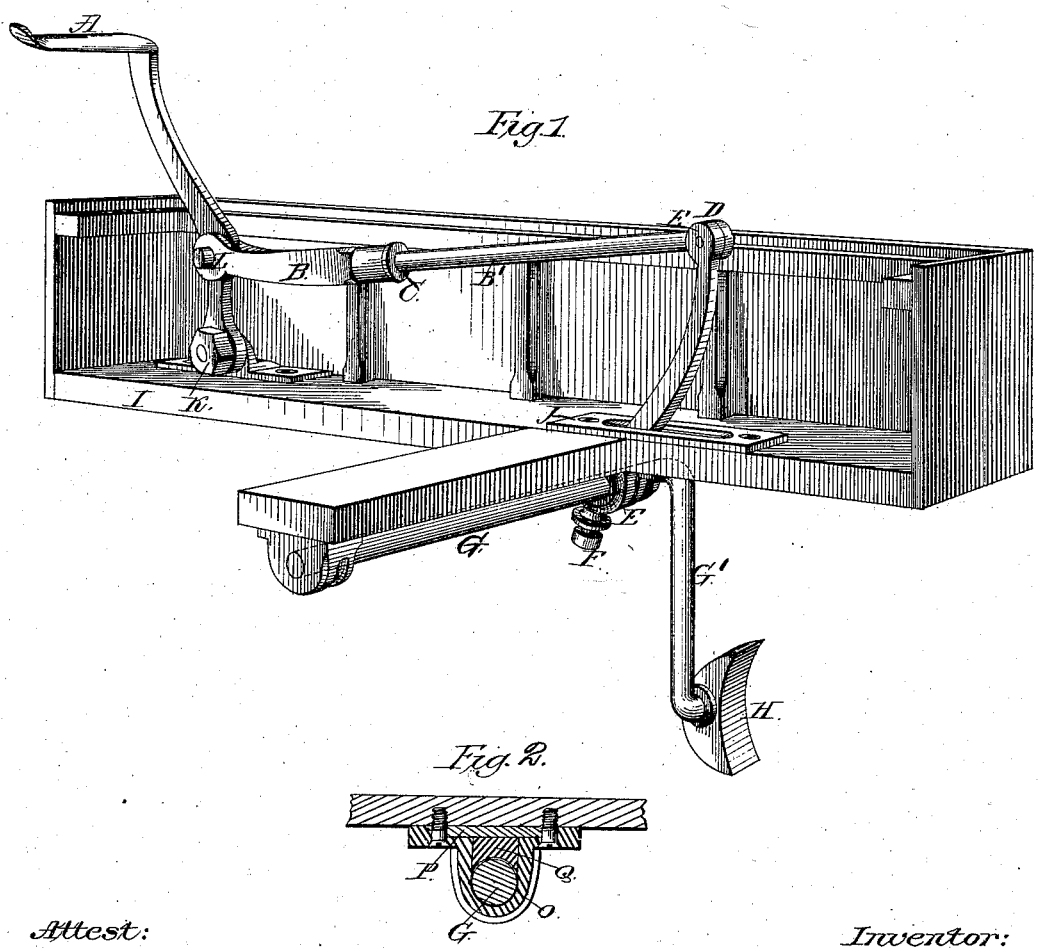

UNITED STATES PATENT OFFICE.

LAWRENCE J. FITZGERALD, OF CORTLAND, NEW YORK.

IMPROVEMENT IN VEHICLE-BRAKES.

Specification forming part of Letters Patent No. 194,515, dated August 28, 1877; application filed July 12, 1877.

*To all whom it may concern:*

Be it known that I, LAWRENCE J. FITZGERALD, of Cortland, Cortland county, New York, have invented a new and useful Improvement in Vehicle-Brakes, of which the following is a clear, full, and exact description, reference being to the accompanying drawings, making a part thereof, in which—

Figure 1 is a perspective view of a portion of a wagon-body with my device attached, and Fig. 2 is a detail.

A is the pedal-lever, which is pivoted upon a stud-plate, which is secured to the framework of the body in any suitable manner, and is located inside of the body of the vehicle, as are all the operative parts of my device, which necessarily extend above the bottom of the body.

The lever A is curved at L, at which point is pivotally attached a curved connecting-rod, provided with an internal screw-thread at C, adapted to receive the straight connecting-rod B', which is pivotally attached to the arm E at D. The arm E passes through a slot in the frame of the body, and is connected to the brake-shaft G by means of the set-screw F.

The brake shaft G is supported at each side of the body by boxes, one of which is shown at Fig. 2, and is provided at its extremity with the brake-block H.

The brake-shaft box consists of the clamp-plate O, which supports the brake-bar G, and incloses the cap-plate P and rubber packing Q, said plates and packing being compressed and attached to the frame of the body by means of screws or bolts, as shown.

The slot through which the bar E passes may be protected by a metal plate, as shown at J.

The operation of my device is as follows: In the drawing, Fig. 1, the brake is represented in its position when in contact with the wheel of the vehicle, and this position is effected by throwing the lever A to the front, which actuates the connecting-rod B B', and it in turn causes the arm E to rotate the brake-shaft, which throws the brake-block against the wheel.

It will readily be seen that by means of the set-screw F the brake-shaft arm G' may be caused to perform its rotation within a greater or less distant space from the wheel, so that as the brake-block H wears away the rotation of the brake-shaft arm G' may be brought nearer the wheel and the pressure preserved at a uniform rate without any other means of adjustment; although I have also provided further means of such adjustment at C on the connecting-rod B. This rod may be adjusted in length by disconnecting it at D, and screwing it into or out of the rod B at C.

When it is desired to release the block H from contact with the wheel the lever A is thrown downward and backward. If this is caused by applying the force at D it will be observed that a line drawn from D to K will pass through all the pivoted connections D, K, and L. Now, if force is applied to the lever A the connection L may be further depressed. This latter operation results in a locking of the device in such a manner that the brake-block H cannot accidentally come in contact with the wheel. This result is due to my construction of the levers A and B, and is effected by curving them, as shown at L and B.

The object of the packing Q is to prevent any rattling of the shaft G in its supports.

Having described my invention, what I claim as new, and desire to secure by Letters Patent, is—

1. The combination, with the brake-block H, brake-shaft G G', and arm E, of the curved connecting-rod B B' and curved lever A, substantially as and for the purpose described.

2. The combination of the curved lever A, curved screw-threaded rod B, threaded rod B', arm E, set-screw F, and brake-shaft G G', as shown and described.

3. The combination of the clamping-plate O, the cap-plate P, packing Q, and brake-shaft G, substantially as and for the purpose described.

4. The combination of the curved lever A, curved connecting-rod B B', arm E, set-screw F, brake-shaft G G', clamping-plate O, packing Q, cap-plate P, and brake-block H, substantially as and for the purposes set forth.

In witness whereof I have hereunto set my hand this 6th day of July, A. D. 1877.

LAWRENCE J. FITZGERALD.

Witnesses:
R. H. DUELL,
W. J. ELSON.